UNITED STATES PATENT OFFICE.

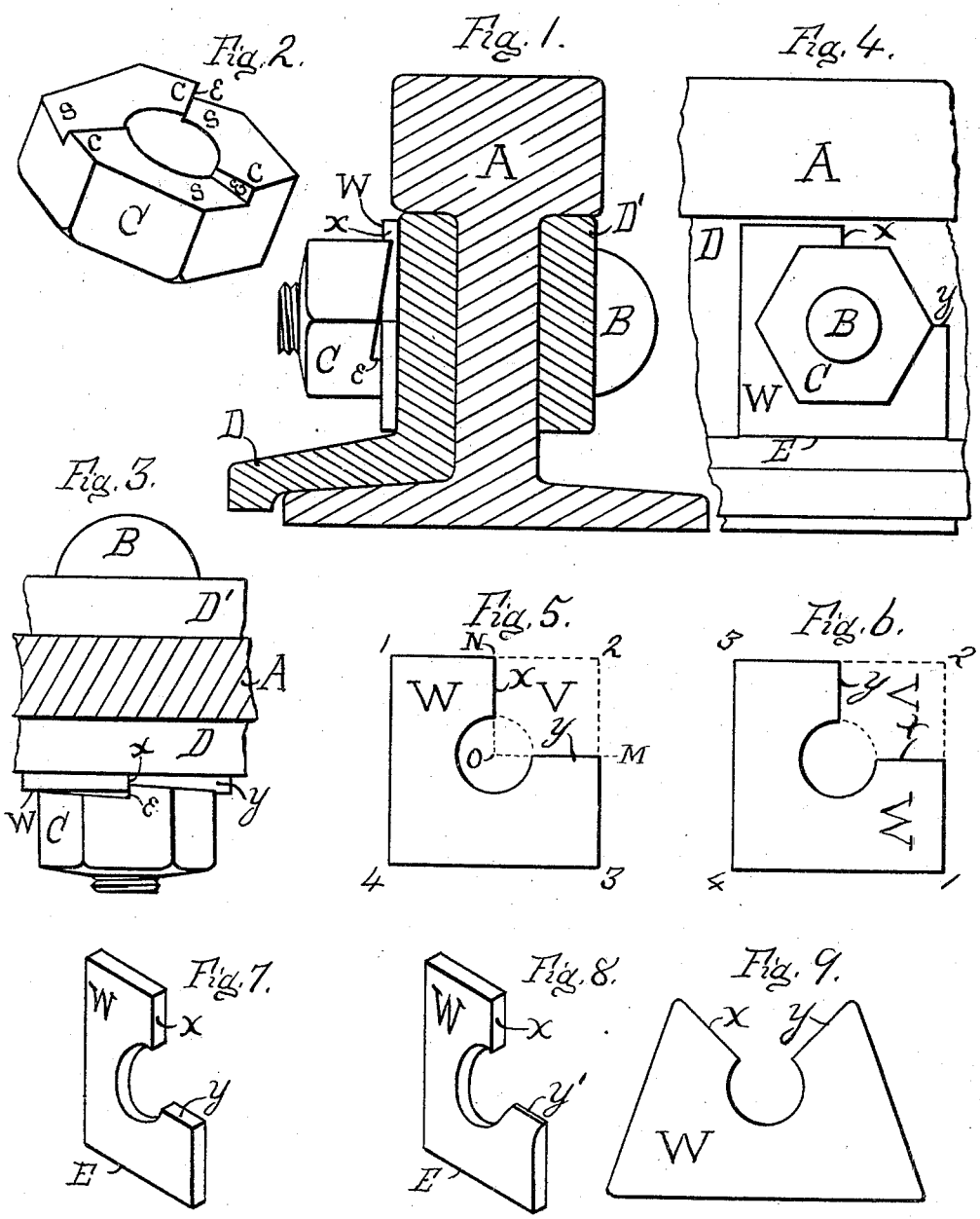

EDWIN R. PROCTER, OF WASHINGTON COURT-HOUSE, OHIO.

NUT-LOCK.

SPECIFICATION forming part of Letters Patent No. 427,611, dated May 13, 1890.

Application filed April 26, 1889. Serial No. 308,677. (Model.)

*To all whom it may concern:*

Be it known that I, EDWIN R. PROCTER, of Washington Court-House, Fayette county, State of Ohio, have invented a new and useful Improvement in Nut-Locks, of which the following is a specification.

My invention is an improvement in the class of devices illustrated by patents to Procter, December 29, 1885, No. 333,155, and Procter, January 5, 1886, No. 333,548, and also other patents for spring-tooth washers, in combination with screw-nuts having ratchet-teeth upon their sole sides.

My device is an improvement upon the spring-lipped variety of washer above mentioned, in that the quality of steel required for the latter is extra fine, and therefore expensive, and generally requires tempering, whereas my washer requires only a fair grade of metal—even iron will do—and requires no tempering. Moreover, the spring-lipped washers above referred to are liable to have the spring-tooth or detent squeezed flat—*i. e.*, to its normal position in the original sheet, from which it was struck up during the operation of turning on the nut—thus taking, as it were, all of the life or spring out of said detent. In this case the detent being lifeless, and below the plane of sole of the toothed nut, it fails to engage the teeth on the sole of said nut and thus offers no impediment to retrograde action of the nut.

In the accompanying drawings, Figure 1 is a sectional view. Fig. 2 is a perspective of nut. Fig. 3 is a top view of device. Fig. 4 is a front view of my device when both washer and nut are on the bolt. Fig. 5 is a view of front of washer. Fig. 6 is a view of back of same. Fig. 7 is a perspective of washer with edges similar. Fig. 8 is a perspective of washer with one edge sloping. Fig. 9 is a view of modified form of my improved washer.

A represents a portion of a rail to be fastened.

B represents a customary screw-bolt.

C represents a ratchet-nut having a series of ratchet-notches $s$ between the high points or projections $c$ and the radial faces or edges $e$ between the projections and notches aforesaid.

D and D' are customary splice-bars, D being of the angle-bar type.

W is a metallic washer, perforated to admit the bolt B, and having a portion of the material composing the said washer cut entirely away on the radial lines O M and O N, the said lines being at right angles approximately to each other, so that the finished washer is, broadly speaking, L-shaped. The edge E of washer, by resting on the top face of lower flange of angle-bar D, opposes rotation of the washer. The nut C has preferably three projections $c$ on its sole, and in the operation of tightening the said nut down upon the washer W whenever one of said projections $c$ is overhanging the gap V in the said washer, the nut being at the same time fairly tight against the face of washer, then a continuance of the tightening process upon the nut has the effect of pitching or tilting the nut sidewise toward and into the gap aforesaid—*i. e.*, there being no resistance on the gap side of the nut the gradually-increasing pressure of washer against the sole of nut in the operation of severe tightening is on two points or projections $c$ only; consequently the remaining or third projection seeking the point of least resistance sinks into the open gap V of the washer—even draws the bolt slightly over toward one side of its hole in the object fastened and toward that side of the perforation in the washer next to gap V. Whenever one of the projections $c$ of nut has sunk by the extreme nut-tightening process above mentioned into the gap V, so that the plane of the sole of nut at that point $c$ is below the plane of the face of the washer W, it is obvious that the edge X of the washer W would, upon a slight backward turning of the nut, engage the radial face $e$ of the said projection $c$, so as to prevent further backward rotation of the nut. Whenever a train passes over a rail-joint locked by a series of these nuts and washers the weight of the passing train exerts an outward pressure on the splice-bars and thence to the sole of nut. This pressure, on account of the formation of the washer, and nut as well, comes principally or wholly upon the two projections $c\ c$, which bear tightly upon the face of washer W, thus serving by the unequal pressure to further tilt the free projection or tooth $c$ into the gap V, and thus to more firmly engage the edge X of washer against the face e at the moment the train is passing.

It is obvious from the drawings (see Figs. 5 and 6) that my improved washer W is reversible. When it is not desired to make use of the reversible feature of the device, then the edge y (shown in Fig. 7) is ground off or otherwise made to take the shape y', (shown in Fig. 8,) so as to avoid the "shearing" effect which a sharp edge like y might have on the projections on the sole of nut in process of tightening the nut.

Bolt-holes made in the objects fastened are generally slightly larger than the diameter of the fastening-bolt; consequently with my device the bending of the bolt is not necessary in order to tilt the nut. If the bolt-holes are in yielding substance, as wood, &c., then no plan would be required between the bolt and its hole, since said substance would "give" sufficiently.

I am aware that washers having a notch cut in one side of same of just sufficient depth to hold to the bolt in certain positions, and having also a tongue projecting out from the notch side of the washer, "so located that when the washer is in place under the nut it (the tongue) will lie in a position just outside of the said nut and will lock the latter when it (the tongue) is bent forward," have been made, and I do not claim invention in any of the above constructions.

I am also aware that the "bolt-locking" washers have been made having a peripheral recess as well as holes through the body of the washer, the said holes being entirely disconnected from said recess, the whole intended "to obviate the liability of wearing a bolt-hole by the torsion of the bolt," and I do not claim any such construction.

What I claim as new and useful, and of my invention, is—

1. The metallic washer having a central bolt-hole and having also a portion of its body cut away on lines starting from the periphery of the washer and converging at a right angle in the said bolt-hole, substantially as and for the purpose stated.

2. The combination, with ratcheted screw-nut C s, of the washer W, having the outer edges 4 1 and 4 3, and the locking edges X and y, substantially as and for the purpose specified.

EDWIN R. PROCTER.

Attest:
  A. D. STATHEM,
  E. D. TRIBBET.